United States Patent [19]
Kimbrough

[11] 3,722,498
[45] Mar. 27, 1973

[54] PORTABLE DEEP FRYER ASSEMBLY

[76] Inventor: Clyde H. Kimbrough, 449 Brookwood Drive, Auburn, Ala. 36820

[22] Filed: Aug. 12, 1971

[21] Appl. No.: 171,160

[52] U.S. Cl. .................. 126/38, 126/9 R, 99/403
[51] Int. Cl. ............................................ F24c 5/20
[58] Field of Search ........... 126/9 R, 9 A, 9 B, 38, 39, 126/40, 369, 364, 365, 390, 391; 99/403

[56] References Cited

UNITED STATES PATENTS

| | | | |
|---|---|---|---|
| 1,218,776 | 3/1917 | Ilitz | 126/9 R |
| 3,313,288 | 4/1967 | Aho | 99/403 UX |
| 1,300,594 | 4/1919 | Ferndon | 126/9 R |
| 1,476,542 | 12/1923 | Rasmussen | 126/38 UX |

FOREIGN PATENTS OR APPLICATIONS

| | | | |
|---|---|---|---|
| 1,454,038 | 1/1969 | Germany | 99/403 |

*Primary Examiner*—Leon G. Machlin
*Attorney*—Polachek, Saulsbury & Hough

[57] ABSTRACT

This deep fryer assembly comprises a plurality of parts which are quickly attachable to one another to make up a deep fryer assembly. The principal part is a vertically extending tube of rectangular section in which is disposed intermediate its height a thick heat plate adapted at the top of the tubular member to contain the cooking oil or shortening and into which a basket can be dropped and lifted out of the oil with its contents after the frying has been done.

The legs are detachably connected, being formed of two parts and such as to fit snugly within the lower open end of the tubular member and retained therein by cleats or clip fasteners. A chimney is detachably connected to the rear of the tubular member and has an opening entering an opening in the flame chute portion of the tubular member. A jet burner is detachably supported and depending from the lower end of the tubular member by U-shaped rod members having elongated ends adapted to be detachably extended through openings adjacent the lower edge of the tubular member. A gas pressure source includes a container having a regulator and a hose connection to a shut-off valve on the burner. A hot high pressure blue flame is directed into the lower end of the tubular member and against the thick heat plate. The flame is covered by the depending shield portion of the tubular member and cannot be emitted from the sides of the plate.

6 Claims, 3 Drawing Figures

PATENTED MAR 27 1973
3,722,498
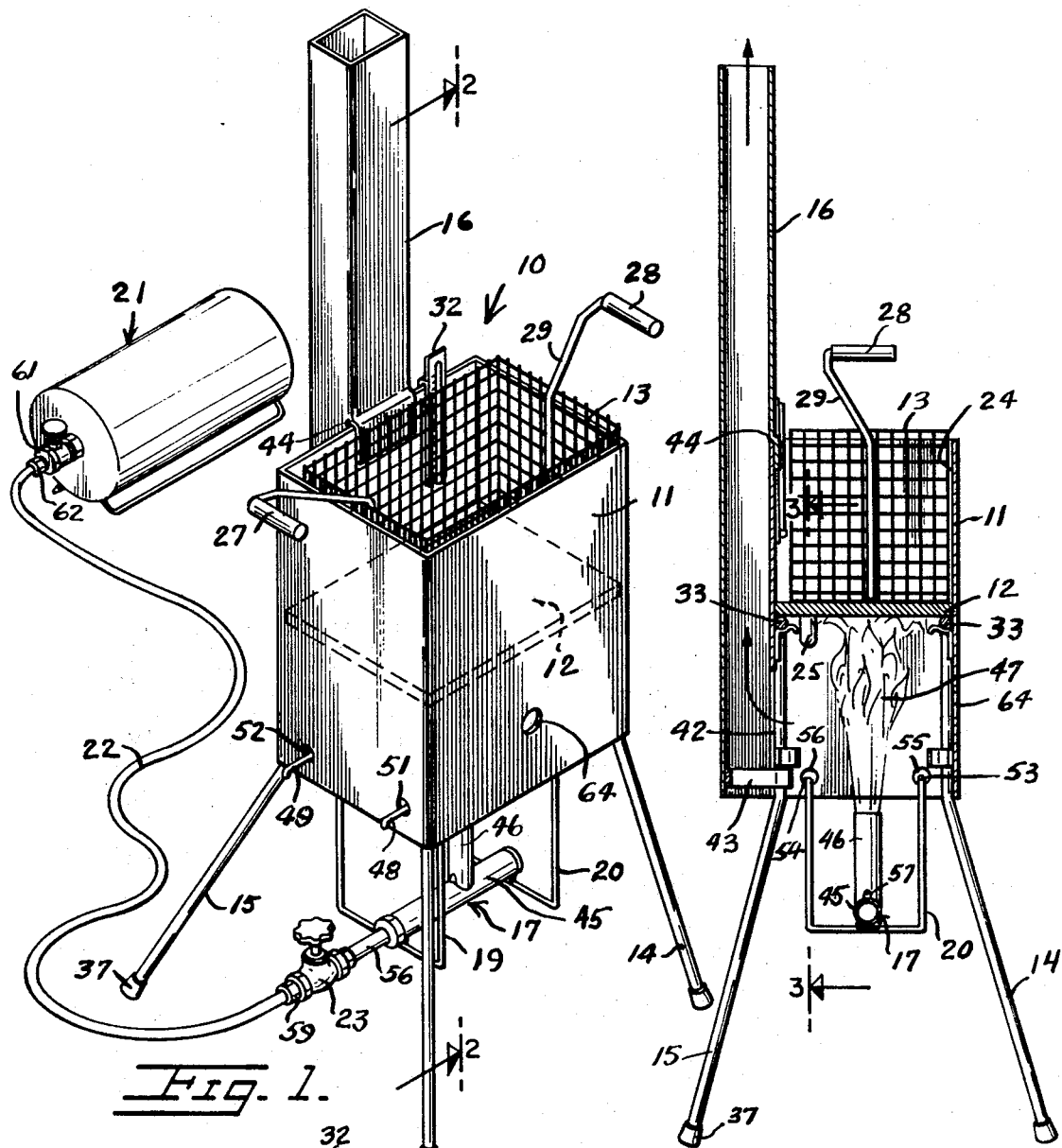
Fig. 1.
Fig. 2.
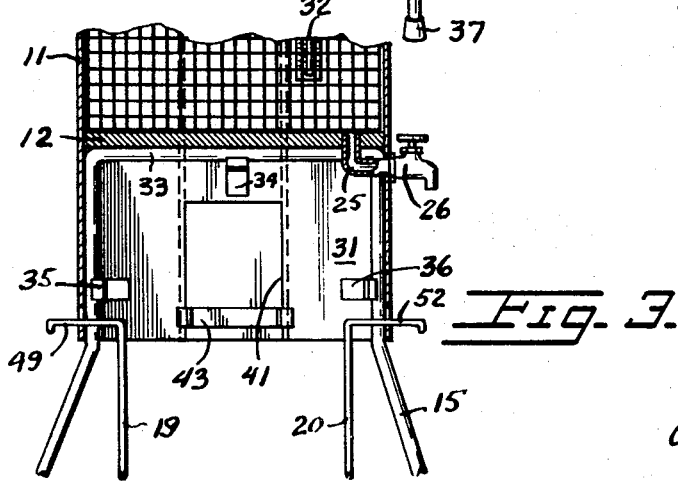
Fig. 3.
INVENTOR.
CLYDE H. KIMBROUGH
BY
Polachek, Saulsbury & Hough
ATTORNEYS.

PORTABLE DEEP FRYER ASSEMBLY

This invention relates to a portable deep fryer assembly of the knock-down type.

It is a principal object of the present invention to provide a deep fryer that can be formed of separable detachable parts such that the fryer can be dissassembled for the purpose of storage or transport.

Another object of this invention is to provide a portable deep fryer adapted for use with a high pressure blue flame and in which the flame will be directed to a thick heat plate and confined within a shielded space thereunder.

It is another object to provide a portable deep fryer with double leg members that are detachably connected by a bent bight portion of a size conforming to the size of the shielded portion so as to lie flush against the wall thereof and adapted to be retained by cleats provided upon the wall and yet providing for downwardly and outwardly radially extended legs from the corners of the deep fryer tubular member.

Other objects of the invention are to provide a portable deep fryer assembly having the above objects in mind, which is of simple construction, has a minimum number of parts, durable and sturdy, has pleasing appearance, inexpensive to manufacture, easy to maintain, efficient and effective in use.

For a better understanding of the invention reference may be had to the following detailed description taken in conjunction with the accompanying drawings, in which:

FIG. 1 is a top perspective view of the portable deep fryer assembly embodying the features of the present invention.

FIG. 2 is a vertical sectional view of the deep fryer assembly as viewed on line 2—2 of FIG. 1.

FIG. 3 is a fragmentary vertical sectional view of the deep fryer as viewed on line 3—3 of FIG. 2.

Referring now to the figures, 10 represents generally the assembled deep fryer constructed according to the present invention parts which are assembled with or disassembled from one another to make up a full self contained deep fryer assembly or to be disassembled from one another for purposes of being stored or shipped.

The assembly can be sold in the form of a kit, consuming little space, boxed and advertised as such and then can be readily assembled at the place where the same is to be used. The parts are readily disassembled from one another so that they can be readily cleaned or repaired, if necessary.

This deep fryer assembly comprising generally a main tubular member 11 of rectangular transverse section having a thick heat plate 12, a basket 13 adapted to be lowered onto the plate 12 within the tubular member 11, bottom double leg members 14 and 15 detachably secured within the underside of the tubular member 11, a side chimney 16 detachably connected to one side of the tubular member 11, a jet burner 17 and its supporting U-shaped rod members 19 and 20 also detachably connected to the underside of the tubular member 11 and a gas supply container 21 connected by a hose 22 to a shut-off valve 23 carried upon the burner jet 17.

The tubular member 11 forms a deep fry section at the top into which the basket 13 and its contents may be lowered and into vegetable oil or other shortening contained into this space. This space is indicated at 24 and is sufficiently deep to accommodate the full depth of the basket 13. The thick heat plate 12 is welded or secured to the inner wall of the tubular member 11, fitting the same exactly and in such as manner as to fully contain the vegetable oil. The space 24 is sufficiently deep to prevent the boiling over of the vegetable oil under normal cooking conditions. The plate 12 is sufficiently thick to hold the heat and effect uniform heating to the full bottom of the space 24, since the plate 12 will distribute the heat high pressure heat from the jet burner 17 can be supplied to the fryer. Although this plate 12 adds considerable weight to the fryer, it renders the same more efficient and permits a tap-out 25 with a drain valve 26 extending through one side of the tubular member 11.

The basket 13 is of corresponding transverse shape to the interior of the tubular member 11 and of the thick plate 12 and rests easily thereupon when lowered into the space 24 and oil therein by its handle rods 27 and 28 welded to the side ends of the basket and laterally outwardly from the top edge of the basket and thus can be gripped without the hands overlying the heated oil or shortening. The handle rods 27 and 28 give the fryer good balance and appearance and also serve as a place to hang cooking utensils.

The tubular member 11 providing the fat containing space above the heat plate 12 depends from the heat plate 12 to provide a heat shield and burner flame receiving space 31 to render the fryer free of flame extending outwardly from the sides of the fryer to endanger the user of the fryer, thereby maintaining efficient uniform heat over the bottom of the heat plate 12. This shielded space and the handle of the tubular member providing for the same allows for the mounting of the chimney 16 upon the tubular member, the mounting of the double leg members 14 and 15 and the mounting of the burner 17 upon the tubular member 11 by means of the U-shaped depending rods 19 and 20.

Adjacent to the chimney 16 there can be placed upon the rear edge of the tubular member 11 so to depend into the oil space 24, a thermometer 32 so that the temperature of the oil can be observed at all times.

The upper ends of the legs 14 and 15 are bent to provide a substantially square shaped bight 33 which is held tightly against a depending wall of the shielded space 31 by a top clip 34 and side clips 35 and 36 as best seen in FIG. 3. In FIG. 3 there is shown the double inverted U-shaped legs 15 having portions flaring outwardly from the corners of the lower end of the tubular member 11 with rubber knobs 37 tight-fitted on the lower ends. Both legs 14 and 15 are thus identically formed at their upper end and are similarly retained by the clips 34, 35 and 36 against their respective side walls of the depending shield space 31. A rigid and firm support is thus provided for the fryer.

With the legs 14 and 15 mounted in the tubular member 11, the chimney 16 is similarly detachably connected to the depending shield extension of the tubular member 11 and upon the rear wall thereof. The rear wall of the shield portion has a cut-away opening 41 extending upwardly from its lower edge to mate with a similar cut-away opening 42 in the front face of the chimney 16 and extending upwardly from its open lower end. In the lower end of the chimney 16 is a double clip 43 welded to the rear wall of the chimney, and extended forwardly so that its clipped leg will spring outwardly over the inside edges of the slot 41 and engage with the inner face of the rear wall of the depending shield portion of the tubular member 11.

Spaced upwardly from the lower end of the chimney 16 and intermediate its height is a depending clip projection 44 adapted to overhang the rear upper edge of the tubular member 11 to hold the chimney in place intermediate its height while the clip 43 holds the chimney in place at its lower end upon the shield portion surrounding the flame space 31. This clip projection 44 serves as a rest for the basket 13 to drain excess shortening before emptying its contents. The basket can be rested by its bottom edge by tilting forwardly against the forward edge of the cooker tubular member 11 about half the depth thereof normally above the shortening.

The burner 17 comprises a tube 45 stretching between the lower ends of the mounting rod members 19 and 20 and extending upwardly from the tube 45 is a flame shield 46 serving to direct the flames upwardly as indicated at 47 and against the underface of the heat plate 12. The rods 19 and 20 are U-shaped and the legs of the same are provided with hook ends 48 and 49 adapted to be inserted through holes 51 and 52 adjacent the lower end of the tubular member 11 and one side end thereof. The U-shaped support 20 as best seen in FIG. 2 has similar hook ends 53 and 54 that are supported respectively in holes 55 and 56 in the opposite side end wall of the tubular member 11. It should be apparent that the burner 17 can be turned about and the hook ends enter opposite holes to have the burner extend from the opposite side of the fryer.

Tubular member 45 of the burner jet 17 is open sufficiently and flame shield 46 is oversized at its lower end or cut-away thereat so as to permit the air to mix with gas being delivered to the burner and in sufficient quantity to provide an efficient hot jet blue flame. A weld 57 secures the flame shield to the member 45. The gas enters the tube or manifold 45 through a small pipe 58 from the shut-off valve 23. An adapter 59 is provided on the valve 23 for the connection of the hose 22 thereto leading from a high pressure gas regulator 61 mounted on one end of the gas container 21 confining gas under high pressure therein. The hose 22 has an adapter 62 for connection with the valve regulator 61 on the gas container 21. This container 21 can be of any type and may or may not be provided as a part of the kit when sold at the store. The hooked ends of the burner supporting rods are made adequately long to prevent the rods 19 and 20 and the burner 17 from being easily disconnected from the lower end of the tubular member 11. A peep hole 64 is provided on the front wall of the tubular member 11 through which the flame 47 can be observed. The hose 22 is of sufficient length to locate the gas tank 21 well away from the flame 47 and this hose 22 is constructed to accommodate gas under high pressure. The double legs 14 and 15 and the burner supporting rods 19 and 20 are made of round rods suitable metal not usually affected by heat. Each two legs of these members are a continuous length of rod shaped to fit and provide stability for upright mounting of the tubular member 11 and of the jet burner 17 thereupon. The tubular member 11 should be made of suitable metals. The heat plate 12 should likewise be made of metal that will withhold large quantities of heat. A fine perforated screen may be placed over the heat plate and supported about one-quarter inch above it but strong enough to support the cooking basket which will serve to catch the excess crumbs that fall from the cooked food and upon the heat plate and upon accumulating in considerable amounts will burn and ruin the shortening.

The chimney is made of suitable metal and extends from the bottom edge of the tubular heat shield member 11 upwardly and above the frying space 24 to a certain distance to provide for adequate up-draft and will pick up the excess heat and flame through its slot 42 at the lower end thereof and prevent the heat and flame from pouring from the bottom of the heat shield and in so doing serves as a safety measure. This chimney and the excess heat may be utilized to mount and maintain a warming device for a receptacle in which to place cooked items. Such devices can be suspended downwardly from the upper ends of the chimney upon being hooked thereover.

It should now be apparent that this equipment can be assembled and disassembled easily and within a short time or in a matter of seconds. The parts are heavy enough to be stable and with the legs flared sufficiently, there is little chance of the fryer being turned over accidentally. The frying space 24 is deep enough to accommodate adequate vegetable oil or other shortening to sufficient depth to cook in deep oils. With the oil removed, hamburgers, steaks and the like can be cooked on the bottom heat plate 12. By placing heavy duty aluminum foil on the heat plate and up the sides of the chamber 24 and over the top of the metal basket a barbecuing of chicken, meat and the like can be effected. The basket can be manipulated with the foil thereon for the best barbecuing or cooking of chicken or other food being cooked. Basting of the food can be made as it is being cooked and as desired. While barbecuing the flame can be maintained at about half its normal blast. The oil or shortening should be allowed to cool before removing the same from the frying chamber 24 through the drain valve 26. On removing the oil it can be strained through a piece of cheesecloth extended over a plastic funnel that is lowered into a container.

What is claimed is:

1. A portable deep fryer assembly comprising a vertically extending tubular member opened at its upper and lower ends, a heat plate extending transversely within the tubular member intermediate its height to provide an oil containing space in the upper end and a heat shield space in its lower end, leg members secured to the lower end of the vertically extending tubular member for supporting the same above a floor surface, a chimney member connected to the rear wall of the vertically extending member and depending downwardly over the heat shield portion thereof, said chimney being open on the side and said heat shield section having an opening leading into the open side of the chimney, and a jet burner disposed under the open lower end of the tubular member into which the flames are directed under pressure for engagement with the under surface of the heat plate secured transversely therewithin.

2. A portable deep fryer as defined in claim 1, and said tubular member being of rectangular section and said legs being formed from two detachable members, each of the two members having an upwardly extending and square bight portion of a dimension adapted to fit within the shielded space and against a single wall thereof and against the underside of the heat plate, the leg ends emitting from the lower edge of the tubular member being flared radially from the corners of the tubular member and cleat formations overlying the bight runs of the upper end of the double leg, there being two such double legs carried respectively in the manner defined against opposing walls of the tubular member.

3. A portable deep fryer as defined in claim 2, and said chimney being detachably connected to the tubular member, said chimney having a double ended cleat engageable with the wall surface of the depending tubular member and over the edge surfaces of the opening from the shielded flame space thereof and a depending lug or clip carried on the chimney and engageable over the upper edge of the tubular member.

4. A portable deep fryer as defined in claim 2, and a burner comprising a manifold tube, U-shaped members having depending bight portions secured respectively to the opposite ends of the manifold tube, an air ventilated shield extending upwardly from the manifold and said U-shaped members having outwardly bent hook formations engageable through holes adjacent the lower edge of the U-shaped member in a detachable manner provided the burner is suspended from the lower end of the U-shaped member.

5. A portable fryer as defined in claim 3, and said burner having a shut-off valve connected thereto, and said high pressure gas source including a container with a pressure regulator valve thereon and a hose connection connected between the valve on the burner and the regulator valve on the high pressure gas container.

6. A portable deep fryer as defined in claim 1, and said thick heat plate having an oil drain fitting connected thereto and a valve spigot carried on the oil drain and extending outwardly of the tubular member.

* * * * *